US011645575B2

(12) United States Patent
Daly et al.

(10) Patent No.: US 11,645,575 B2
(45) Date of Patent: May 9, 2023

(54) LINKING ACTIONS TO MACHINE LEARNING PREDICTION EXPLANATIONS

(71) Applicant: INTERNATIONAL BUSINESS MACHINES CORPORATION, Armonk, NY (US)

(72) Inventors: Elizabeth Daly, Dublin (IE); Oznur Alkan, Clonsilla (IE); Massimiliano Mattetti, Dublin (IE); Inge Vejsbjerg, Kilmainham (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 604 days.

(21) Appl. No.: 16/239,276

(22) Filed: Jan. 3, 2019

(65) Prior Publication Data

US 2020/0219004 A1  Jul. 9, 2020

(51) Int. Cl.
*G06N 20/00* (2019.01)
*G06N 5/02* (2023.01)

(52) U.S. Cl.
CPC .............. *G06N 20/00* (2019.01); *G06N 5/02* (2013.01)

(58) Field of Classification Search
None
See application file for complete search history.

(56) References Cited

U.S. PATENT DOCUMENTS

2014/0067463 A1   3/2014   Richter
2016/0140474 A1   5/2016   Vekker

OTHER PUBLICATIONS

Guyon, Isabelle, and André Elisseeff. "An introduction to variable and feature selection." Journal of machine learning research 3. Mar. 2003: 1157-1182. (Year: 2003).*
Q. Yao et al., "Taking the Human out of Learning Applications: a Survey on Automated Machine Learning", https://arxiv.org/abs/1810.13306v2, Dec. 24, 2018. 26 pages. (Year: 2018).*
Buitinck, Lars, et al. "API design for machine learning software: experiences from the scikit-learn project." arXiv preprint arXiv:1309.0238 (2013). (Year: 2013).*
Lee, Keon Myung, Kwang Il Kim, and Jaesoo Yoo. "Autonomicity levels and requirements for automated machine learning." Proceedings of the International Conference on Research in Adaptive and Convergent Systems. 2017. (Year: 2001).*
Zhao H, Wang P, Hu Q. Cost-sensitive feature selection based on adaptive neighborhood granularity with multi-level confidence. Information Sciences. Oct. 20, 2016; 366:134-49. (Year: 2016).*

(Continued)

*Primary Examiner* — Vincent Gonzales
(74) *Attorney, Agent, or Firm* — Griffiths & Seaton PLLC

(57) ABSTRACT

Embodiments for recommending actions to improve machine learning predictions by a processor. One or more recommended actions may be linked to one or more features that influence a predicted outcome of a prediction model of a machine learning operation. One or more features having one or more negative factors that negatively impact the predicted outcome of the prediction model may be determined and selected. One or more of the linked recommended actions may be applied to one or more of the features to mitigate a negative impact upon the predicted outcome of the prediction model.

14 Claims, 8 Drawing Sheets

(56) References Cited

OTHER PUBLICATIONS

Zhao H, Min F, Zhu W. Cost-sensitive feature selection of numeric data with measurement errors. Journal of Applied Mathematics. Mar. 2013. (Year: 2013).*

Ling CX, Sheng VS, Yang Q. Test strategies for cost-sensitive decision trees. IEEE Transactions on Knowledge and Data Engineering. Jun. 26, 2006;18(8):1055-67. (Year: 2006).*

* cited by examiner

| FEATURE | ACTION | SERVICE NAME | URL |
|---|---|---|---|
| ROLE EXPERIENCE | API CALL | TEAM RECOMMENDER | /TEAMREC?ROLE=ARCHITECT&OPPID=XYZ |
| DEAL SIZE | API CALL | TEAM RECOMMENDER | /TEAMREC?ROLE=OWNER&OPPID=XYZ |
| EXPERIENCE SECTOR | N/A | N/A | N/A |
| IBU EXPERIENCE | API CALL | TEAM RECOMMENDER | /TEAMREC?ROLE=OWNER&OPPID=XYZ |
| COUNTRY EXPERIENCE | API CALL | TRANSLATION SERVICE | /GETTRANSLATOR?LANGUAGE=DE |
| CUSTOMER EXPERIENCE | API CALL | TEAM RECOMMENDER | /TEAMREC?ROLE=CLIENTREP&CLIENTID=XYZ |
| PRODUCT | API CALL | PRODUCT RECOMMENDER | /PRODREC?SIMILARTO=COGNOS |
| IBU | N/A | N/A | N/A |
| PRODUCT EXPERIENCE | API CALL | PRODUCT TRAINING RESOURCES | /LEARNING?PRODID=XYZT |
| SELLER WORK LOAD | ALERT | NOTIFY MANAGER | /ALERT?MANAGERID=07977&TYPE=OVERLOAD |
| PRODUCT PRICING | ALERT | CONTACT PRICING MANAGER | /ALERT?OPPID=XYZ&OPPID=XYZ&CURPRICE=9000 |

FIG. 6A

| FEATURE NEEDING IMPROVEMENT | RECOMMENDED ACTION | RECOMMENDATION ENGINE NAME | EXPLANATION |
|---|---|---|---|
| ROLE EXPERIENCE | ADD A TEAM MEMBER | TEAM RECOMMENDER | ADDING A TEAM MEMBER WITH EXPERIENCE IN THIS ROLE WILL IMPROVE THE SCORE IN THE ROLE DIMENSION |
| DEAL SIZE EXPERIENCE | ADD A TEAM MEMBER | TEAM RECOMMENDER | ADDING A TEAM MEMBER WITH EXPERIENCE WITH THIS DEAL SIZE WILL IMPROVE THE SCORE IN THIS DIMENSION |
| SECTOR | N/A | N/A | NOTHING CAN BE DONE TO IMPROVE OUTCOME |
| PRODUCT EXPERIENCE | SUGGEST A TRAINING COURSE | PRODUCT TRAINING RESOURCES | TRAINING ACTIVITIES ARE SUGGESTED TO IMPROVE THE SELLERS' CHANCE OF SUCCESS |
| PRODUCT PRICING | SUGGEST LOWERING PRICE OF PRODUCT | PRICE RECOMMENDER | CONTACT PRICING MANAGER TO SUGGEST LOWERING PRICE TO INCREASE THE CHANCE OF THE DEAL BEING SUCCESSFULLY CONCLUDED. |

FIG. 6B

LINKING ACTIONS TO MACHINE LEARNING PREDICTION EXPLANATIONS

BACKGROUND OF THE INVENTION

Field of the Invention

The present invention relates in general to computing systems, and more particularly to, various embodiments for linking actions to machine learning prediction explanations by a processor.

Description of the Related Art

In today's society, consumers, businesspersons, educators, and others communicate over a wide variety of mediums in real time, across great distances, and many times without boundaries or borders. With the increased usage of computing networks, such as the Internet, humans are currently inundated and overwhelmed with the amount of information available to them from various structured and unstructured sources. Due to the recent advancement of information technology and the growing popularity of the Internet, a wide variety of computer systems have been used in machine learning. Machine learning is a form of artificial intelligence that is employed to allow computers to evolve behaviors based on empirical data.

SUMMARY OF THE INVENTION

Various embodiments for linking actions to machine learning prediction explanations by a processor, are provided. In one embodiment, by way of example only, a method for recommending actions to improve machine learning predictions, again by a processor, is provided. One or more recommended actions may be linked to one or more features that influence a predicted outcome of a prediction model of a machine learning operation. One or more features having one or more negative factors that negatively impact the predicted outcome of the prediction model may be determined and selected. One or more of the linked recommended actions may be applied to one or more of the features to mitigate a negative impact upon the predicted outcome of the prediction model.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 6A-6B are table diagrams depicting linking features to recommended actions in which various aspects of the present invention may be realized.

DETAILED DESCRIPTION OF THE DRAWINGS

Figure 1:
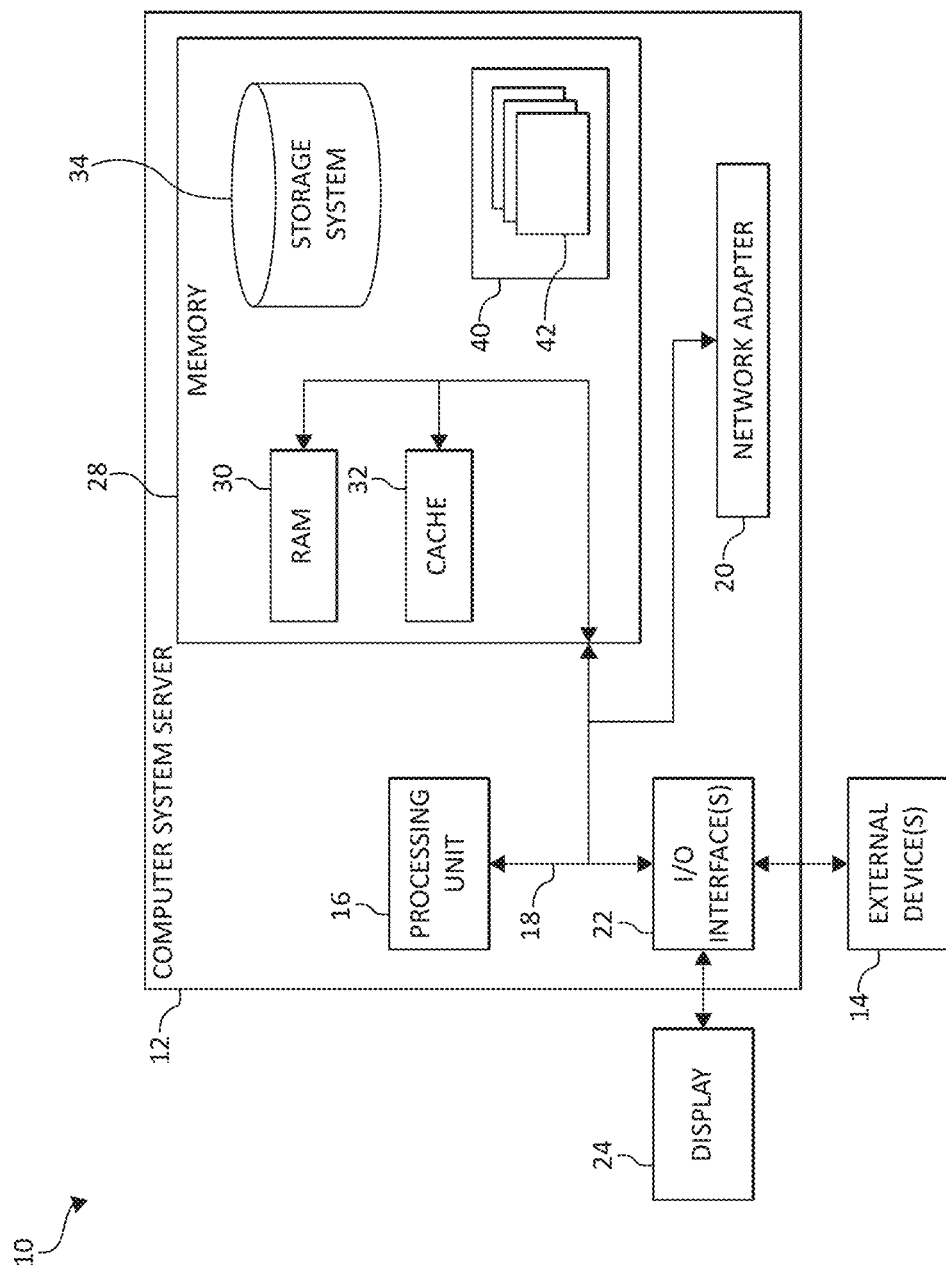
FIG. 1 is a block diagram depicting an exemplary cloud computing node according to an embodiment of the present invention.

Machine learning allows for an automated processing system (a "machine"), such as a computer system or specialized processing circuit, to develop generalizations about particular data sets and use the generalizations to solve associated problems by, for example, classifying new data. Once a machine learns generalizations from (or is trained using) known properties from the input or training data, it can apply the generalizations to future data to predict unknown properties.

In machine learning and cognitive science, neural networks are a family of statistical learning models inspired by the biological neural networks of animals, and in particular the brain. Neural networks can be used to estimate or approximate systems and functions that depend on a large number of inputs and are generally unknown. Neural networks use a class of algorithms based on a concept of inter-connected "neurons." In a typical neural network, neurons have a given activation function that operates on the inputs. By determining proper connection weights (a process also referred to as "training"), a neural network achieves efficient recognition of desired patterns, such as images and characters. Oftentimes, these neurons are grouped into "layers" in order to make connections between groups more obvious and to each computation of values. Training the neural network is a computationally intense process. For example, designing machine learning (ML) models, particularly neural networks for deep learning, is a trial-and-error process, and typically the machine learning model is a black box.

Predictive modeling techniques are of central importance in applications such as, for example, database marketing, targeted advertising, and information retrieval. Recent advances in machine learning have worked to improve explicability and interpretation of predictions. These explanations help a user understand both the predicted outcome and also those factors that may be influencing the prediction and to what extent. As such, the present invention provides a framework to support linking a predictive output from an instance based explanation to recommended actions to tackle these factors.

In one aspect, the mechanisms of the illustrated embodiments provide a computing system that links actions to machine learning prediction explanations. One or more recommended actions may be linked to one or more features that influence a predicted outcome of a prediction model of a machine learning operation. The recommended actions may be applied to one or more features to increase a prediction accuracy of the prediction model. That is, one or more features having one or more negative factors that negatively impact the predicted outcome of the prediction model may be determined and selected. One or more of the linked recommended actions may be applied to one or more of the features to mitigate a negative impact upon the predicted outcome of the prediction model.

Said differently, the present invention provides for identifying factors that influence a machine learning's prediction/outcome for recommending actions to adjust, change, alter, and/or maintain factors for improving the overall machine learning's prediction/outcome. In one aspect, a user may be enabled to create links to one or more services providing actions for mitigating one or more identified negative factors influencing the machine learning's prediction/outcome. Those of the negative factors that can be improved are identified/determined and those of the negative features that are the least costly as compared to the other negative factors that can be improved through applying one or more of the recommendation actions may be selected.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
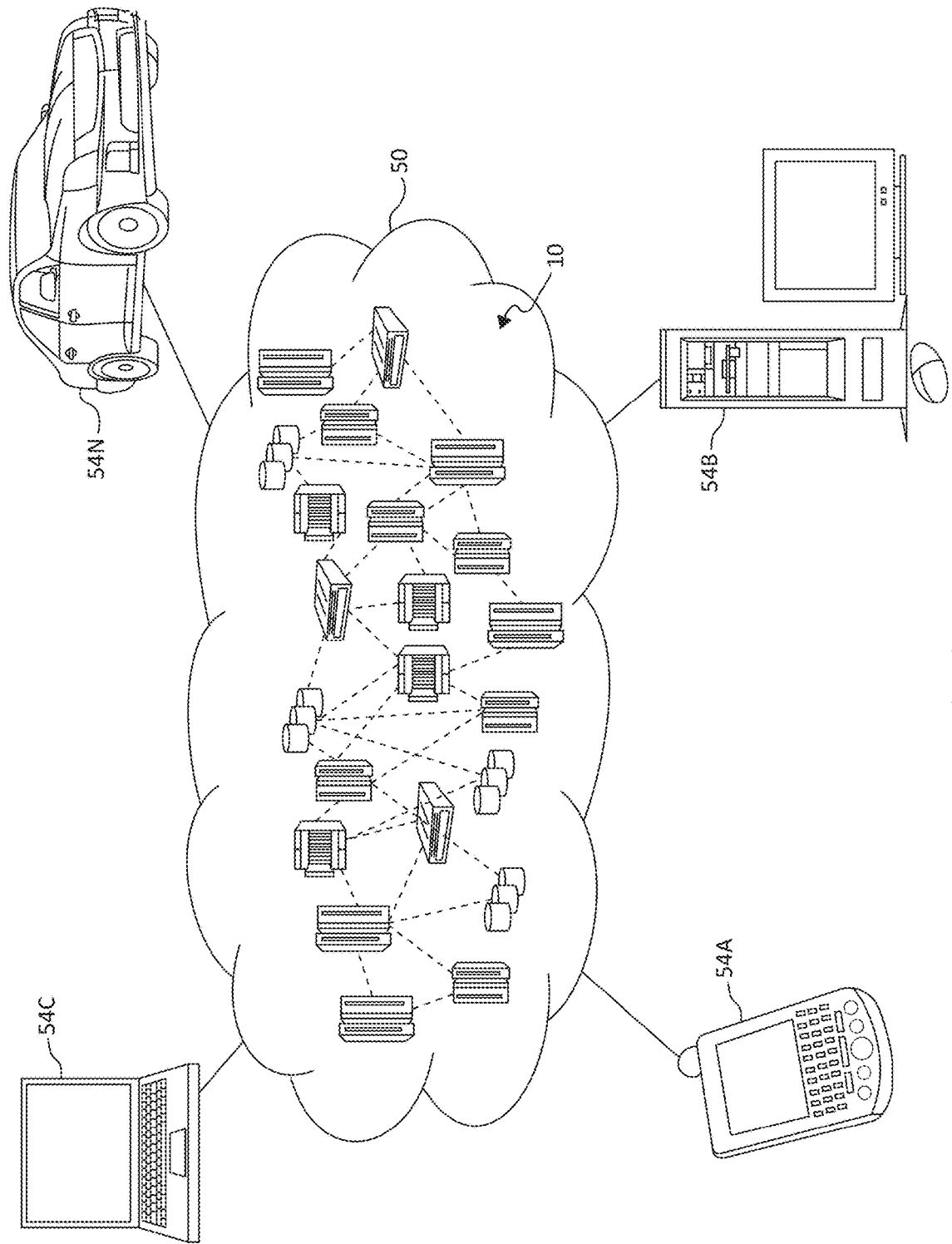
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
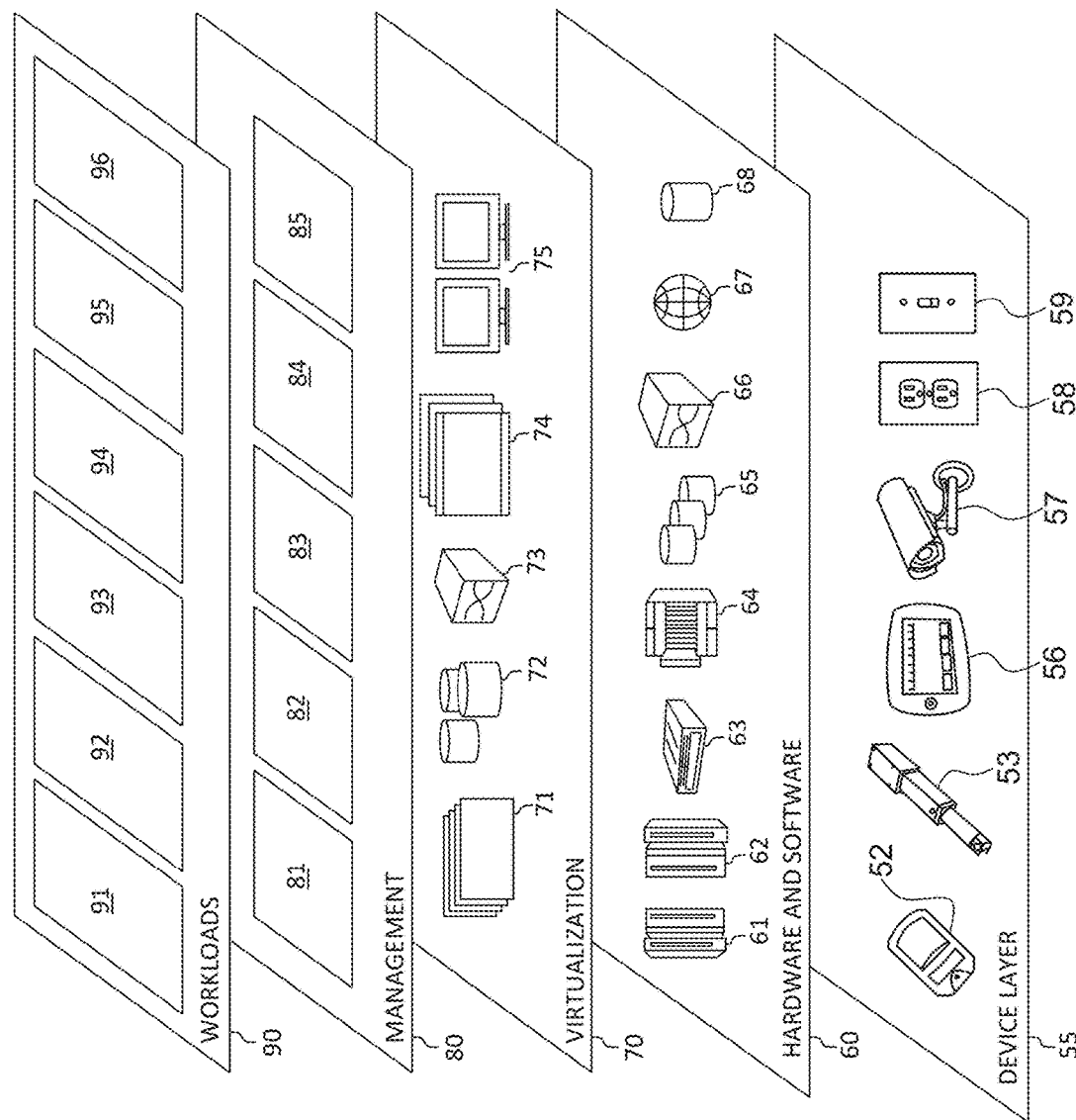
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for linking actions to machine learning prediction explanations. In addition, workloads and functions 96 for linking actions to machine learning prediction explanations may include such operations as data analytics, data analysis, and as will be further described, notification functionality. One of ordinary skill in the art will appreciate that the workloads and functions 96 for linking actions to machine learning prediction explanations may also work in conjunction with other portions of the various abstraction layers, such as those in hardware and software 60, virtualization 70, management 80, and other workloads 90 (such as data analytics processing 94, for example) to accomplish the various purposes of the illustrated embodiments of the present invention.

As previously stated, the present invention provides for identifying factors that influence a machine learning's prediction/outcome for recommending actions to adjust, change, alter, and/or maintain factors for improving the overall machine learning's prediction/outcome. In one aspect, a user may be enabled to create links to one or more services providing actions for mitigating one or more identified factors influencing the machine learning's prediction/outcome. Those of the factors that can be improved are identified/determined and those of the features that are the least costly as compared to the other factors that can be improved through applying one or more of the recommendation actions may be selected.

In one aspect, linking features to one or more recommendation actions may be performed by one or more operations. In a first operation for linking actions to features, a machine learning operation may be used for linking modifications of features to predictive outcomes of a prediction model. In an additional operation for linking actions to features, a user may define one or more features that impact/influence a prediction model by modifying, adjusting, altering, changing, maintaining and/or updating the factors of a prediction model such as, for example, by recommending a reduction in price or recommending finding an alternative employee to perform a job role with more experience. In one aspect, a cognitive, computing system may automatically recommend/trigger one or more recommendation actions. However, some actions may be outside of the scope of a machine learning model/cognitive, computing system such as, for example, if a determination is made that a team member (e.g., a sales representative) should upskill and study and/or learn additional domain knowledge and/or acquire additional skills/resources. As such, one or more recommended actions may link features to additional components that provide one or more recommendation actions.

Figure 4:
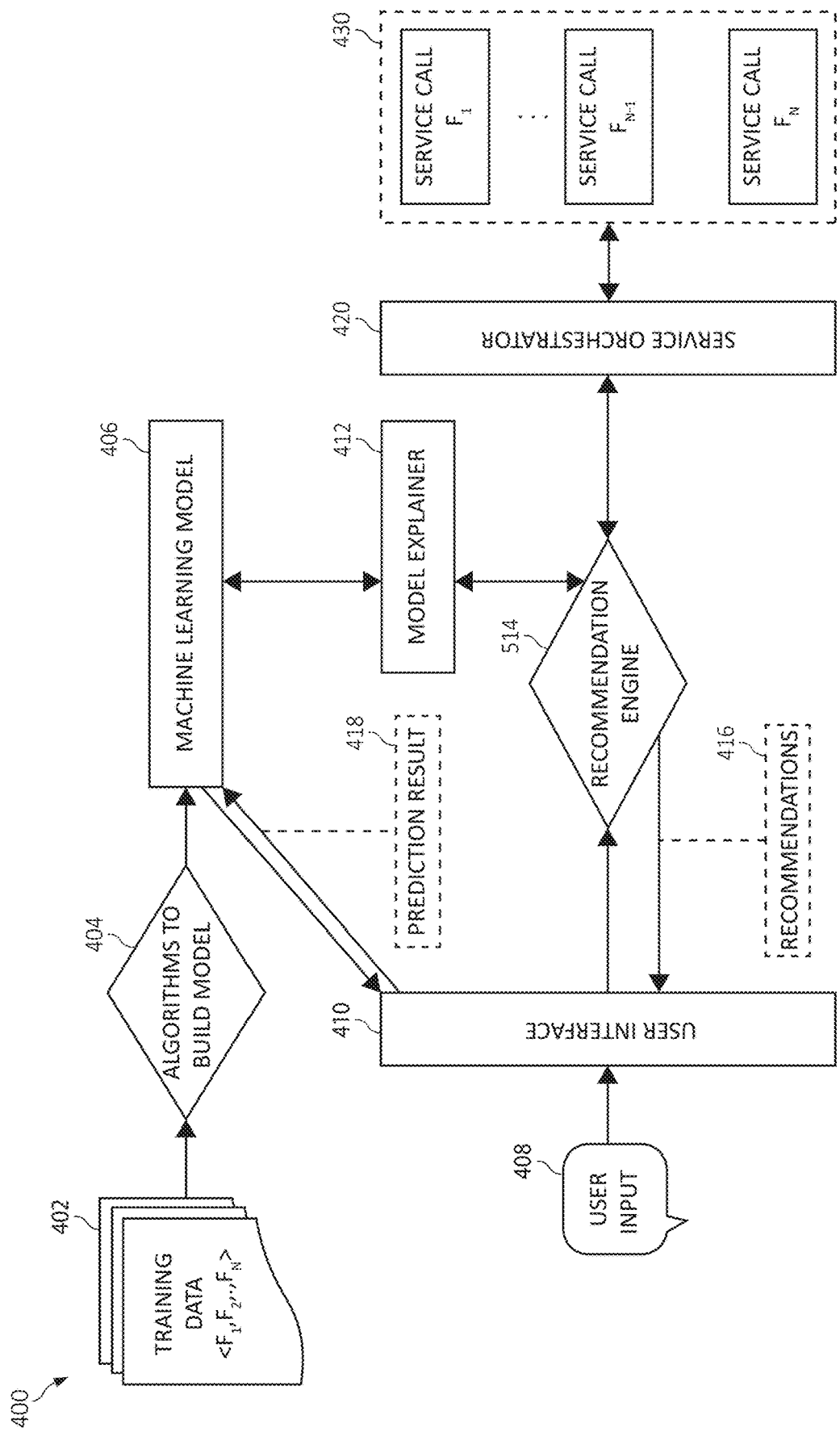
FIG. 4 is an additional block diagram depicting various user hardware and computing components functioning in accordance with aspects of the present invention.

Turning now to FIG. 4, a block diagram of exemplary functionality 400 relating to linking actions to machine learning prediction explanations is depicted according to various aspects of the present invention. In one aspect, one or more of the components, modules, services, applications, and/or functions described in FIGS. 1-3 may be used in FIG. 4.

As shown, the various blocks of functionality are depicted with arrows designating the blocks' 400 relationships with each other and to show process flow. Additionally, descriptive information is also seen relating each of the functional blocks 400. As will be seen, many of the functional blocks may also be considered "modules" of functionality, in the same descriptive sense as has been previously described in FIGS. 1-3. For example, computer system/server 12 of FIG. 1, incorporating processing unit 16, may perform various computational, data processing and other functionality in accordance with various aspects of the present invention as described in FIG. 4.

With the foregoing in mind, the module blocks 400 may also be incorporated into various hardware and software components of a system (e.g., computer system/server 12 of FIG. 1) in accordance with the present invention. Many of the functional blocks 400 may execute as background processes on various components, either in distributed computing components, or on the user device, or elsewhere.

Starting with block 404, training data 402 (e.g., $f_1$, $f_2$, . . . , $f_n$) may be used to build one or more predictive models (e.g., select one or more algorithms to build a predictive model). A machine learning model 406 may use one or more of the predictive models to predict an outcome/prediction results 418. The machine learning model 406 may be a collection of models which provides a feature level breakdown of the contributing factors to a final overall prediction.

A user interface ("UI") 410 such as, for example, a graphical user interface ("GUI") may provide the prediction results 418 to a user. The user may provide user input 408 to the UI 410. That is, the user may be enabled to create one or more links between one or more services that provide one or more recommended actions via UI 410, which may then be used to mitigate one or more identified negative factors negatively influencing the prediction results 418.

A model explainer component 412 may take the output (e.g., the prediction results 418) of the machine learning model 406 and analyze each of the factors having an influence/impact upon the prediction results 418. More specifically, the model explainer component 412 may identify each of the factors having a negative impact/influence on the prediction result 418. The model explainer component 412 determines which of the negative factors may be improved (e.g., adjust, change, alter, and/or maintained) and selects the least costly features (as compared to the other negative factors) among the factors to be improved through selecting, applying, and/or executing one or more of the recommendation actions.

A recommendation engine 414 (e.g., a recommendation component) may infer one or more recommended actions ("recommendations") if the recommended actions may be executed internally within a computing system (e.g., where the necessary information and factors can be in control of a cognitive system such as, for example, a recommended action of lowering a price). The UI 410 may support overriding any automated recommended actions (e.g., via the user 408) by linking the recommended actions to one or more external services, if necessary. In one aspect, the recommendation engine 414, in association with the UI 410 may link one or more recommended actions to one or more features that influence a predicted outcome of a prediction model of a machine learning operation.

The recommendation engine 414, in association with the model explainer 412, may rank those of the one or more features having one or more negative factors that negatively impact the predicted outcome of the prediction model and apply the recommended actions to one or more ranked features to mitigate a negative impact upon the predicted outcome of the prediction model caused by the one or more negative factors.

In one aspect, the recommendation engine 414, in association with a service orchestrator 420 may issue one or more service call operations 430 such as, for example, service call $f_1$, service call $f_{n-1}$, . . . , and/or service call $f_n$, to provide the one or more recommended actions by one or more services.

In one aspect, the machine learning model 406 may use one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Figure 5:
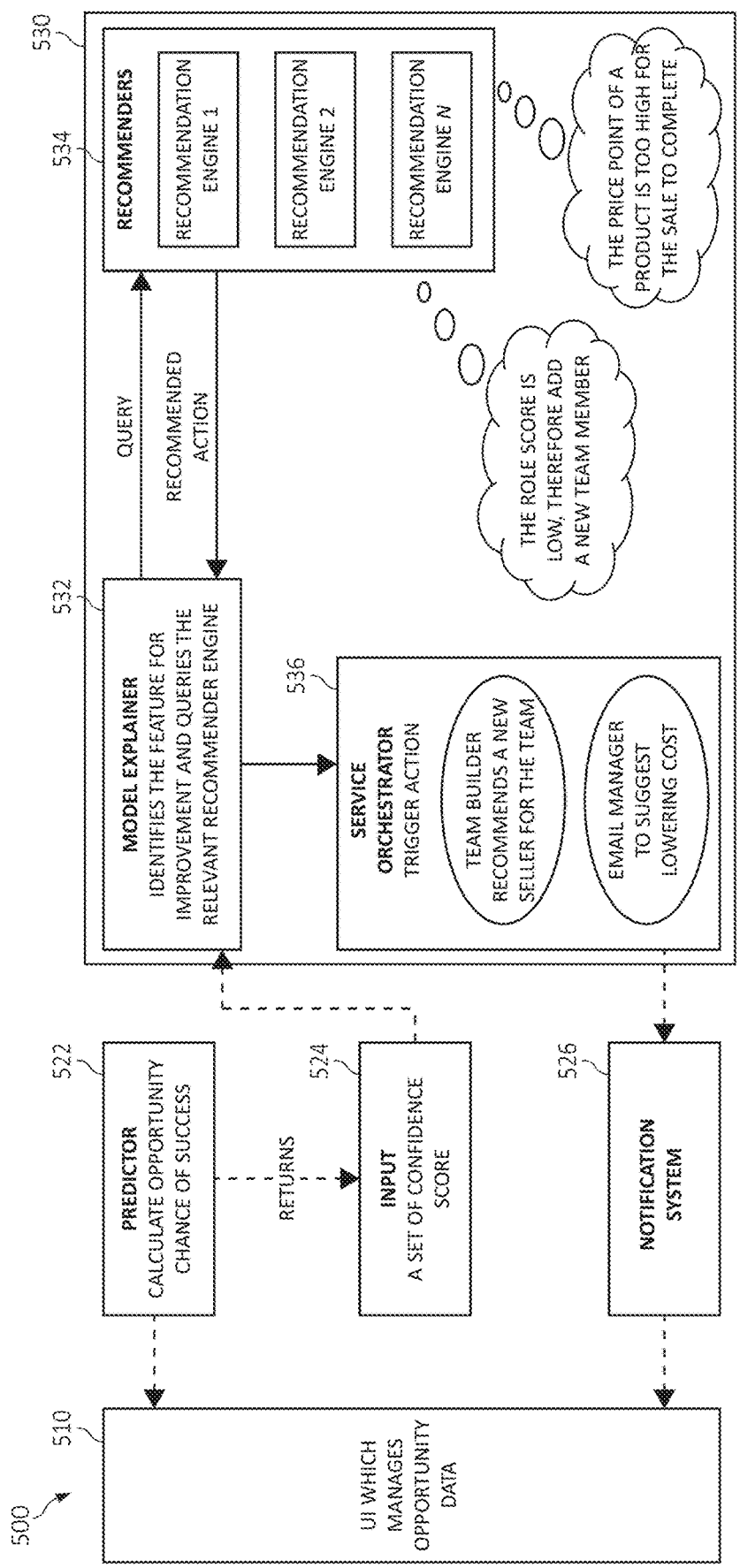
FIG. 5 is an additional block diagram depicting various user hardware and computing components functioning in accordance with aspects of the present invention

Turning now to FIG. 5, a block diagram of exemplary functionality 500 relating to linking actions to machine learning prediction explanations is depicted using a sample use case involving a sale operation for an entity/organization. In one aspect, one or more of the components, modules, services, applications, and/or functions described in FIGS. 1-4 may be used in FIG. 5. Repetitive description of like elements, components, modules, services, applications, and/or functions employed in other embodiments described herein is omitted for sake of brevity. As shown, the various blocks of functionality are depicted with arrows designating the blocks' 500 relationships with each other and to show process flow. Additionally, descriptive information is also seen relating each of the functional blocks 500.

Starting with block 510, a UI manages opportunity data. An opportunity (e.g., a business opportunity) may be a "transactional operation" such as, for example, a sales opportunity or vendor-client relationship. An opportunity may also be where unmet and unarticulated needs are uncovered to create innovation opportunities. An opportunity may also include new or upgraded products and services that may be sold or products or services that do not exist. Using the opportunity data from UI 510, a predictor component 522 may determine/calculate an opportunities success rate (e.g., determine a confidence score representing the opportunity's "chance of success"). The opportunities success rate/confidence score may be a selected value, a value within a range of values, and/or a percentage. That is, the opportunities success rate may be a confidence score indicating an opportunities percentage chance or rate for success. The opportunities success rate/confidence score may be used as input 524 with a set of confidence scores provided to a model explainer 532 (see 412 of FIG. 4) of a linking action service 530.

In one aspect, the linking action service 530 may include a model explainer 532, a plurality of recommender engines 534 ("recommenders"), and a service orchestrator 536, each of which may be in communication with each other. The linking action service 530 may be included within the computer system/server 12 of FIG. 1 and able to perform various computational, data processing and other functionality in accordance with various aspects of the present invention. Additionally, the linking action service 530 may include the predictor 522 and the notification system 526, each of which may also be included within the computer system/server 12 of FIG. 1 and able to perform various computational, data processing and other functionality in accordance with various aspects of the present invention.

The model explainer 532 may identify one or more features for improvement (e.g., increase accuracy of a prediction outcome/result of a prediction model) and query one of the plurality of recommender engines 534 (e.g., appropriate/relevant recommender engine such as, for example, recommender engine 1, recommender engine 2, and/or recommender engine n). One of the plurality of recommender engines 534 may recommend one or more recommended actions to adjust, change, modify, and/or change one of the factors influencing/impacting the prediction results of a prediction model, which may be communicated back to the model explainer 532. For example, the recommended actions may indicate 1) a role score (e.g., a team member role being a factor) is low (as compared to other role scores or a role score threshold value) and therefore a new team member is recommended to be added to the team, and/or 2) the price point (e.g., price being a factor influencing/impacting the predictive results) of a product may be too high for the sale (e.g., based on historical values, markets research, and/or competitor product pricing comparison data, etc.) to complete so the recommended action may be to reduce the price.

The model explainer 532 may send the one or more recommended actions (received from the plurality of recommenders 534) to a service orchestrator 536. The service orchestrator 536 may issue one or more service call operations and trigger one or more recommended actions to be performed/executed by one or more services. For example, a team builder (e.g., an external service) may recommend a new team member (e.g., sales representative) for a team (e.g., a sales team) and/or an email manager (e.g., an internal and/or external service) may suggest to lower a price cost of a good or service.

A notification system 526 may communicate, back to the UI 510, the recommended actions, which may be triggered by the service orchestrator 536.

Turning now to FIGS. 6A-6B, table 600 of FIG. 6A depicts features linked to recommended actions via a user-controlled UE. Table 625 of FIG. 6B depicts linking features to recommendation actions. In one aspect, one or more of the components, modules, services, applications, and/or functions described in FIGS. 1-4 may be used to create and use tables 600 and 625 of FIGS. 6A and 6B. Repetitive description of like elements, components, modules, services, applications, and/or functions employed in other embodiments described herein is omitted for sake of brevity.

For example, table 600 illustrates one or more columns that include features, actions, service names, and a uniform resource locator ("URL") with corresponding rows. For example, the feature of "role experience" may be linked to an action (e.g., recommended actions) such as, for example, an application programming interface ("API") call for team recommender with an associated URL "/teamRec?role=Architect&oppID=XYZ".

Table 625 illustrates one or more columns that include features needing improvement, a recommended action, a recommendation engine name, and an explanation. For example, the features needing improvement of "role experience" may be linked to a recommended action such as, for example, add a team member. The recommendation engine name may be recommended via "team recommender" service by the recommendation engine name. The explanation provided may be a recommendation to add a team member with experience in the role so as to improve the score in the role dimension.

Figure 7:
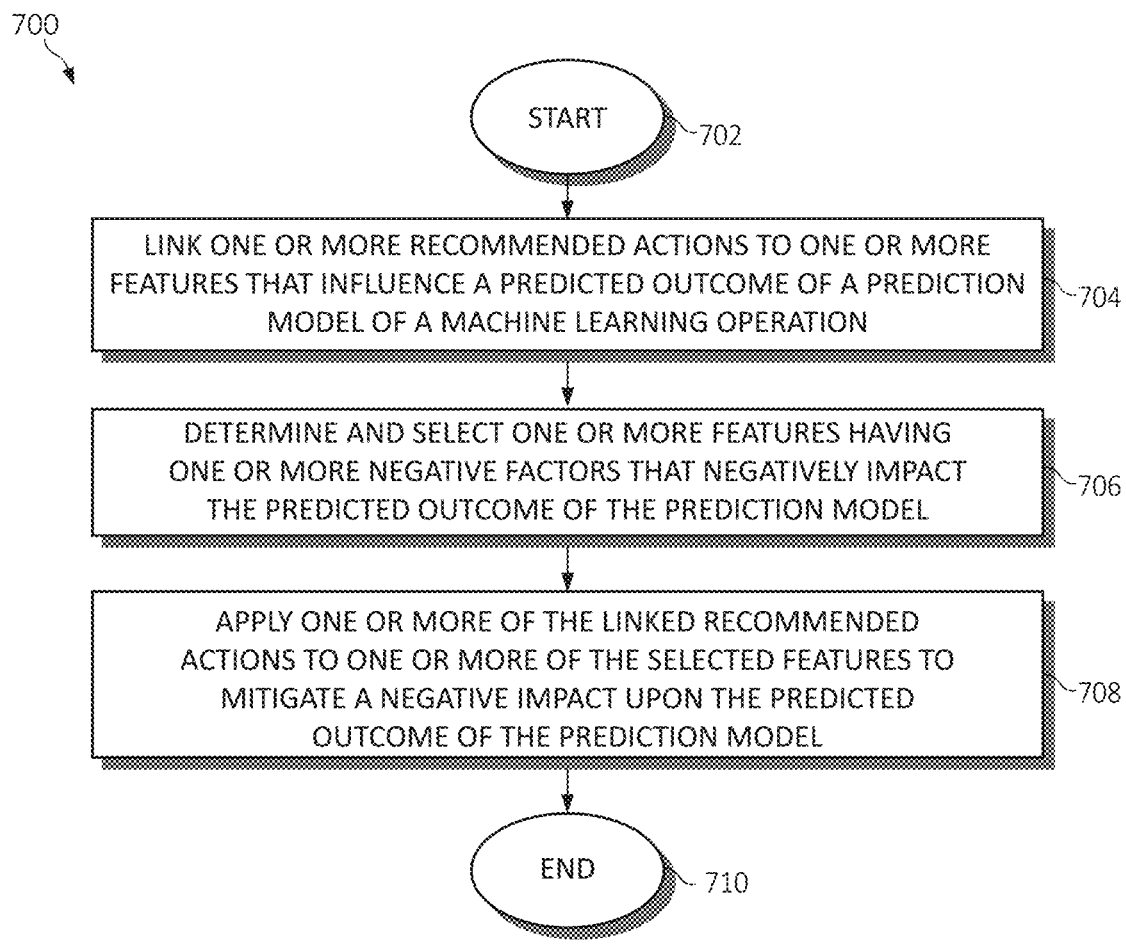
FIG. 7 is a flowchart diagram depicting an exemplary method for linking features to recommended actions again in which various aspects of the present invention may be realized.

FIG. 7 is an additional flowchart diagram 700 depicting an additional exemplary method for recommending actions to improve machine learning predictions, again in which various aspects of the present invention may be realized. The functionality 700 may be implemented as a method executed as instructions on a machine, where the instructions are included on at least one computer readable medium or one non-transitory machine-readable storage medium. The functionality 700 may start in block 702.

One or more recommended actions may be linked to one or more features that influence a predicted outcome of a prediction model of a machine learning operation, as in block 704. One or more features having one or more negative factors that negatively impact the predicted outcome of the prediction model may be determined and selected, as in block 706. One or more of the linked recommended actions may be applied to one or more of the features to mitigate a negative impact upon the predicted outcome of the prediction model, as in block 708. The functionality 700 may end, as in block 710.

In one aspect, in conjunction with and/or as part of at least one block of FIG. 7, the operations of method 700 may include each of the following. The operations of method 700 may identify the one or more features influencing the predicted outcome of the prediction model. The operations of method 700 may rank those of the one or more features having one or more negative factors that negatively impact the predicted outcome of the prediction model and apply the recommended actions to one or more ranked features to mitigate a negative impact upon the predicted outcome of the prediction model caused by the one or more negative factors. The operations of method 700 create (e.g., enable a user to create) one or more links between one or more services that provide the one or more recommended actions. One or more service call operations to provide the one or more recommended actions by one or more services.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for recommending actions to improve machine learning predictions by a processor, comprising:
   receiving training data to build a predictive model;
   executing machine learning logic to generate the predictive model using the training data;
   analyzing the predictive model to determine one or more features that influence a predicted outcome of the prediction model, wherein the analyzing includes selecting those of a plurality of features used in the predictive model being associated with an action having a least monetary cost, as compared with alternative actions being associated with alternative features, which improve the predicted outcome as the one or more features;
   identifying one or more recommended actions linked to the one or more features that, when performed, modify the one or more features that influence the predicted outcome of the prediction model, wherein the one or more recommended actions are generated specifically for the predictive model only after a first instance of an execution of the predictive model, and wherein the identifying of the one or more recommended actions includes:
      receiving, on a user interface (UI), opportunity data associated with a transactional operation between entities,
      predicting, by the predictive model according to an analyzation of the opportunity data, an opportunities success rate for the transactional operation,
      inputting the opportunities success rate and a set of confidence scores to a model explainer, identifying from the input, by the model explainer, the one or more features having one or more negative factors that negatively impact the predicted outcome of the predictive model, querying, by the model explainer, one or more recommender engines to identify the one or more recommended actions, wherein the one or more recommender engines infer whether the one or more recommended actions are able to be executed internally by the processor, and transmitting the one or more recommended actions to a service orchestrator, wherein the service orchestrator issues one or more service call operations to trigger the one or more recommended actions to be performed; and executing the one or more recommended actions to modify the one or more features, wherein the executing of the one or more recommended actions results in an increase in an accuracy of the predicted outcome of the prediction model.

2. The method of claim 1, further including determining those of the one or more features having the one or more negative factors that negatively impact the predicted outcome of the prediction model.

3. The method of claim 1, further including applying the recommended actions to the one or more features to mitigate a negative impact upon the predicted outcome of the prediction model.

4. The method of claim 1, further including:
ranking those of the one or more features having the one or more negative factors that negatively impact the predicted outcome of the prediction model; and
applying the recommended actions to one or more ranked features to mitigate a negative impact upon the predicted outcome of the prediction model caused by the one or more negative factors.

5. The method of claim 1, further including creating one or more links between one or more services that provide the one or more recommended actions.

6. A system for recommending actions to improve machine learning predictions, comprising:
one or more computers with executable instructions that when executed cause the system to:
receive training data to build a predictive model;
execute machine learning logic to generate the predictive model using the training data;
analyze the predictive model to determine one or more features that influence a predicted outcome of the prediction model, wherein the analyzing includes selecting those of a plurality of features used in the predictive model being associated with an action having a least monetary cost, as compared with alternative actions being associated with alternative features, which improve the predicted outcome as the one or more features;
identify one or more recommended actions linked to the one or more features that, when performed, modify the one or more features that influence the predicted outcome of the prediction model, wherein the one or more recommended actions are generated specifically for the predictive model only after a first instance of an execution of the predictive model, and wherein the identifying of the one or more recommended actions includes:
receiving, on a user interface (UI), opportunity data associated with a transactional operation between entities, predicting, by the predictive model according to an analyzation of the opportunity data, an opportunities success rate for the transactional operation,
inputting the opportunities success rate and a set of confidence scores to a model explainer,
identifying from the input, by the model explainer, the one or more features having one or more negative factors that negatively impact the predicted outcome of the predictive model,
querying, by the model explainer, one or more recommender engines to identify the one or more recommended actions, wherein the one or more recommender engines infer whether the one or more recommended actions are able to be executed internally by the processor, and
transmitting the one or more recommended actions to a service orchestrator, wherein the service orchestrator issues one or more service call operations to trigger the one or more recommended actions to be performed; and
execute the one or more recommended actions to modify the one or more features, wherein the executing of the one or more recommended actions results in an increase in an accuracy of the predicted outcome of the prediction model.

7. The system of claim 6, wherein the executable instructions further determine those of the one or more features having the one or more negative factors that negatively impact the predicted outcome of the prediction model.

8. The system of claim 6, wherein the executable instructions further apply the recommended actions to the one or more features to mitigate a negative impact upon the predicted outcome of the prediction model.

9. The system of claim 6, wherein the executable instructions further:
rank those of the one or more features having the one or more negative factors that negatively impact the predicted outcome of the prediction model; and
apply the recommended actions to one or more ranked features to mitigate a negative impact upon the predicted outcome of the prediction model caused by the one or more negative factors.

10. The system of claim 6, wherein the executable instructions further create one or more links between one or more services that provide the one or more recommended actions.

11. A computer program product for recommending actions to improve machine learning predictions by a processor, the computer program product comprising a non-transitory computer-readable storage medium having computer-readable program code portions stored therein, the computer-readable program code portions comprising:
an executable portion that receives training data to build a predictive model;
an executable portion that executes machine learning logic to generate the predictive model using the training data;
an executable portion that analyzes the predictive model to determine one or more features that influence a predicted outcome of the prediction model, wherein the analyzing includes selecting those of a plurality of features used in the predictive model being associated with an action having a least monetary cost, as compared with alternative actions being associated with alternative features, which improve the predicted outcome as the one or more features;
an executable portion that identifies one or more recommended actions linked to the one or more features that, when performed, modify the one or more features that influence the predicted outcome of the prediction model, wherein the one or more recommended actions are generated specifically for the predictive model only after a first instance of an execution of the predictive model, and wherein the identifying of the one or more recommended actions includes:

receiving, on a user interface (UI), opportunity data associated with a transactional operation between entities, predicting, by the predictive model according to an analyzation of the opportunity data, an opportunities success rate for the transactional operation, inputting the opportunities success rate and a set of confidence scores to a model explainer, identifying from the input, by the model explainer, the one or more features having one or more negative factors that negatively impact the predicted outcome of the predictive model, querying, by the model explainer, one or more recommender engines to identify the one or more recommended actions, wherein the one or more recommender engines infer whether the one or more recommended actions are able to be executed internally by the processor, and transmitting the one or more recommended actions to a service orchestrator, wherein the service orchestrator issues one or more service call operations to trigger the one or more recommended actions to be performed; and an executable portion that executes the one or more recommended actions to modify the one or more features, wherein the executing of the one or more recommended actions results in an increase in an accuracy of the predicted outcome of the prediction model.

12. The computer program product of claim 11, further including an executable portion that:

determines those of the one or more features having the one or more negative factors that negatively impact the predicted outcome of the prediction model; and applies the recommended actions to the one or more features to mitigate a negative impact upon the predicted outcome of the prediction model.

13. The computer program product of claim 11, further including an executable portion that:

ranks those of the one or more features having the one or more negative factors that negatively impact the predicted outcome of the prediction model; and applies the recommended actions to one or more ranked features to mitigate a negative impact upon the predicted outcome of the prediction model caused by the one or more negative factors.

14. The computer program product of claim 11, further including an executable portion that creates one or more links between one or more services that provide the one or more recommended actions.

* * * * *